United States Patent
Ogasawara et al.

(10) Patent No.: US 7,628,397 B2
(45) Date of Patent: Dec. 8, 2009

(54) SHEET CARRYING DEVICE, AND DOCUMENT CARRYING APPARATUS AND IMAGE FORMING APPARATUS USING THE SHEET CARRYING DEVICE

(75) Inventors: Hironori Ogasawara, Yamato-Koriyama (JP); Yasumasa Morimoto, Kashihara (JP); Masato Tamehira, Nara (JP); Yoshinori Shiraishi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/349,699

(22) Filed: Jan. 7, 2009

(65) Prior Publication Data
US 2009/0179376 A1    Jul. 16, 2009

(30) Foreign Application Priority Data
Jan. 11, 2008    (JP)    ............................. 2008-003976

(51) Int. Cl.
*B65H 31/26*    (2006.01)
(52) U.S. Cl. ........................................ 271/220; 271/902
(58) Field of Classification Search ................. 271/225, 271/184, 902, 220; 399/405
See application file for complete search history.

(56) References Cited

U.S. PATENT DOCUMENTS

| | | | |
|---|---|---|---|
| 3,847,388 A * | 11/1974 | Lynch | ......................... 271/306 |
| 4,916,493 A * | 4/1990 | DeVito | ........................ 399/402 |
| 5,014,976 A | 5/1991 | Muck et al. | |
| 5,549,292 A * | 8/1996 | Plain | .......................... 271/291 |
| 6,073,927 A * | 6/2000 | Sako et al. | .................. 271/225 |
| 2005/0067765 A1* | 3/2005 | Watanabe et al. | ........... 271/225 |

FOREIGN PATENT DOCUMENTS

| | | |
|---|---|---|
| JP | 04-223481 | 8/1992 |
| JP | 05-044951 | 6/1993 |

* cited by examiner

*Primary Examiner*—David H Bollinger
(74) *Attorney, Agent, or Firm*—Renner, Otto, Boisselle & Sklar, LLP

(57) ABSTRACT

A sheet carrying device has a mechanism that prevents a sheet from being fed backward into a carriage path after once discharged from the device, and the sheet carrying device includes a carriage surface that guides a sheet, a reverse roller attached to a rotation shaft of a sheet discharging portion, whose rotation direction is switchable between forward and backward, and a backward-feed prevention valve that prevents an edge of a discharged sheet from entering into a nip portion of the reverse roller, and the backward-feed prevention valve includes a resin sheet and an elastic member disposed at one end on the sheet discharging side of the resin sheet, and the elastic member has one surface supported by the rotation shaft of the reverse roller and the other surface pressing the resin sheet against the carriage surface.

6 Claims, 7 Drawing Sheets

SHEET CARRYING DEVICE, AND DOCUMENT CARRYING APPARATUS AND IMAGE FORMING APPARATUS USING THE SHEET CARRYING DEVICE

CROSS-NOTING PARAGRAPH

This Non-provisional application claims priority under 35 U.S.C. §119(a) on Patent Application No. 2008-003976 filed in JAPAN on Jan. 11, 2008, the entire contents of which are hereby incorporated herein by reference.

FIELD OF THE INVENTION

The present invention relates to a carrying device used in an image forming apparatus, a ticket issuing apparatus, etc., and, more particularly, to a sheet carrying device including a mechanism that prevents a sheet such as a document and a recording paper sheet from being fed backward into a carriage path after once discharged from the device, and a document carrying apparatus and an image forming apparatus using the sheet carrying device.

BACKGROUND OF THE INVENTION

Image forming apparatuses are provided with a reverse roller for reversing a document or recoding paper into an ejecting portion to perform double-side reading or double-side printing. On the other hand, the reverse roller may roll up an end of a discharged sheet and feed the sheet backward into a carriage path when reversed, which may cause jamming.

To prevent this situation, for example, Utility Model Application Publication No. 05-044951 discloses an anti-reverse mechanism that includes an extending portion which is provided on a sheet guide and extends from a discharge roller toward the discharging direction and a sheet stopper which is pressed against a medium traveling side of the extending portion of the sheet guide. Since the extending portion of the sheet guide is pressed against the sheet stopper, the anti-reverse mechanism prevents a sheet from entering into a nip portion of the discharge rollers even when the discharge rollers are reversed.

However, since the anti-reverse mechanism described in Utility Model Application Publication No. 05-044951 must be provided with two members, which are the extending portion of the sheet guide and the sheet stopper, and it is difficult to adjust the press force between the both members, it is problematic that another mechanism adjusting the press force must be provided to certainly prevent the backward feed.

SUMMARY OF THE INVENTION

It is an object of the present invention to provide a sheet carrying device having a mechanism which is capable of smoothly discharging and reliably preventing the reversal of sheet with a simple configuration, and a document carrying apparatus and an image forming apparatus using the sheet carrying device.

It is another object of the present invention to provide a sheet carrying device comprising a carriage surface that guides a sheet; a reverse roller attached to a rotation shaft of a sheet discharging portion, whose rotation direction is switchable between forward and backward; and a backward-feed prevention valve that prevents an edge of a discharged sheet from entering into a nip portion of the reverse roller, wherein the backward-feed prevention valve includes a resin sheet and an elastic member which is disposed at one end on the sheet discharging side of the resin sheet, and the elastic member has one surface supported by the rotation shaft of the reverse roller and the other surface pressing the resin sheet against the carriage surface.

It is another object of the present invention to provide the sheet carrying device, wherein the edge of surface on the sheet discharging side of the elastic member is located further toward the sheet discharging side than the nip portion of the reverse roller.

It is another object of the present invention to provide the sheet carrying device, wherein the backward-feed prevention valves are disposed at the both axial ends of the reverse roller, respectively.

It is another object of the present invention to provide the sheet carrying device, wherein the reverse roller has a coaxial collar and the side of the elastic member of the backward-feed prevention valve is in contact with the collar.

It is another object of the present invention to provide a document carrying apparatus comprising the sheet carrying device described above.

It is another object of the present invention to provide an image forming apparatus comprising the sheet carrying device described above.

PREFERRED EMBODIMENTS OF THE INVENTION

A preferred embodiment of a sheet carrying device, an image forming apparatus and a document carrying apparatus equipped with the sheet carrying device of the present invention will now be described with reference to the accompanying drawings.

Figure 1:
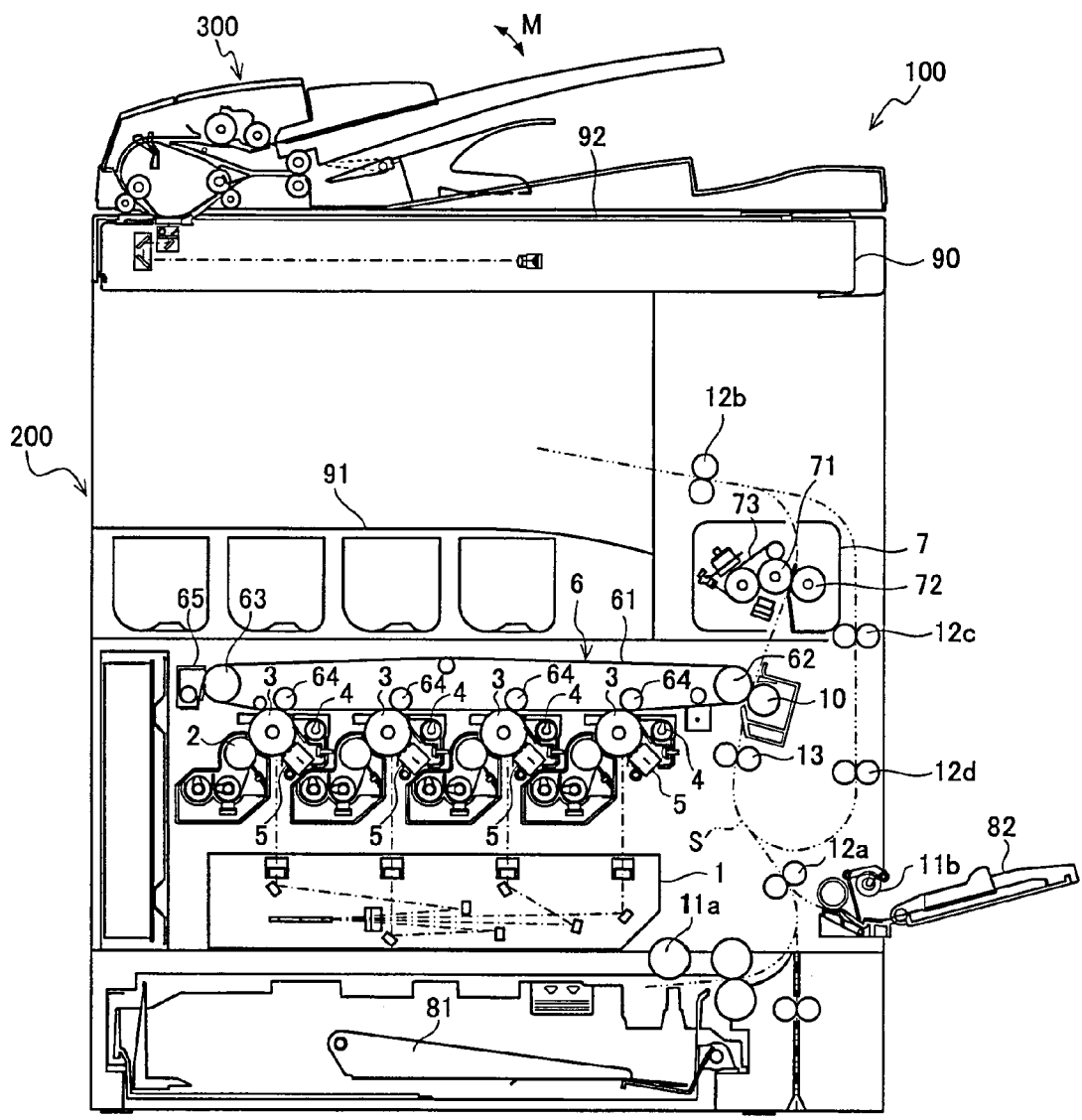
FIG. 1 depicts a configuration example of an image forming apparatus equipped with a sheet carrying device according to one embodiment of the present invention.

FIG. 1 depicts a configuration example of an image forming apparatus 100 equipped with a sheet carrying device according to one embodiment of the present invention.

The image forming apparatus 100 forms multicolor or monochrome images on predetermined sheets (recording paper sheets) depending on image data transmitted from the outside and is made up of an apparatus main body 200 and an auto document feeder 300. The apparatus main body 200 includes an exposure unit 1, developing devices 2, photoconductive drums 3, cleaner units 4, charging devices 5, an intermediate transfer belt unit 6, a fixing unit 7, a paper feed cassette 81, a paper discharge tray 91, etc.

On the upper part of the apparatus main body 200, a document platform 92 made of clear glass is disposed for placing a document, and the auto document feeder 300 is mounted on the upper side of the document platform 92. The auto document feeder 300 automatically feeds a document onto the document platform 92. The auto document feeder 300 is configured to be rotatable in directions of an arrow M, and a document can manually be placed on the document platform 92 by opening the auto document feeder 300 on the document platform 92.

The image data handled in the image forming apparatus corresponds to a color image using colors of black (K), cyan (C), magenta (M), and yellow (Y). Therefore, four sets of the development devices 2, the photoconductive drums 3, the charging devices 5, and the cleaner units 4 are provided such that four types of latent images are formed correspondingly to four colors, and each set is set to black, cyan, magenta, or yellow to make up four image stations.

The charging device 5 is a charging means for uniformly charging the surface of the photoconductive drum 3 to a predetermined electric potential and, a contact roller type or brush type charging device may be used in addition to the charger type charging device shown in FIG. 1.

The exposure unit 1 corresponds to an image writing apparatus and is configured as a laser scanning unit (LSU) including a laser emitting portion and a reflection mirror. The exposure unit 1 is comprised of a polygon mirror that scans laser beams, and optical components such as lenses and mirrors for guiding the laser light reflected by the polygon mirror to the photoconductive drums 3. For example, an EL or LED writing head having light-emitting elements arranged in an array may also be used as the exposure unit 1 in some techniques.

The exposure unit 1 has a function of exposing the charged photoconductive drum 3 according to the input image data to form an electrostatic latent image according to the image data on the surface. The developing device 2 develops the electrostatic latent images formed on the each photoconductive drums 3 with toners of four colors (Y, M, C, and K). The cleaner units 4 remove and collect the toners remaining on the surface of the photoconductive drum 3 after the development and the image transfer.

The intermediate transfer belt unit 6 is disposed above the photoconductive drums 3 and includes an intermediate transfer belt 61, an intermediate transfer belt driving roller 62, an intermediate transfer belt driven roller 63, intermediate transfer rollers 64, and an intermediate transfer belt cleaning unit 65. Four intermediate transfer rollers 64 are provided correspondingly to four colors of Y, M, C, and K.

The intermediate transfer belt 61 is stretched and rotationally driven by the intermediate transfer belt driving roller 62, the intermediate transfer belt driven roller 63, and the intermediate transfer rollers 64. The intermediate transfer rollers 64 give a transfer bias for transferring the toner images on the photoconductive drums 3 onto the intermediate transfer belt 61.

The intermediate transfer belt 61 is provided to be in contact with the photoconductive drums 3. The intermediate transfer belt 61 has a function of forming a color toner image (multicolor toner image) on the intermediate transfer belt 61 by sequentially transferring and overlapping the each color toner images formed on the photoconductive drums 3 onto the intermediate transfer belt 61. For example, the intermediate transfer belt 61 is made of a film with a thickness of about 100 μm to 150 μm in an endless shape.

The transfer of the toner images from the photoconductive drums 3 to the intermediate transfer belt 61 is performed by the intermediate transfer rollers 64 in contact with the back side of the intermediate transfer belt 61. To the intermediate transfer rollers 64, a high-voltage transfer bias (high voltage with a polarity (+) opposite to a charging polarity (−) of toner) is applied to transfer the toner images. The intermediate transfer roller 64 is a roller having a metal (e.g., stainless steel) shaft with a diameter of 8 to 10 mm as a base and the surface of the shaft is covered with a conductive elastic material (e.g., EPDM or urethane foam). The high voltage can uniformly be applied to the intermediate transfer belt 61 with this conductive elastic material. Although the roller shape is used for the transfer electrode in this embodiment, other shapes such as a brush shape may also be used.

The electrostatic images are developed on the photoconductive drums 3 in accordance with the hues as described above and is laminated on the intermediate transfer belt 61. The laminated image information is transferred through the rotation of the intermediate transfer belt 61 onto a paper sheet by a transfer roller 10 described later disposed at a contact position between the paper sheet and the intermediate transfer belt 61.

The intermediate transfer belt 61 and the transfer roller 10 are pressed against each other with a predetermined nip and a voltage (voltage with a polarity (+) opposite to a charging polarity (−) of toner) is applied to the transfer roller 10 to transfer the toner to the paper sheet. To constantly obtain the nip, any one of the transfer roller 10 and the intermediate transfer belt driving roller 62 is made of a hard material (e.g., metal) and the other is made of a soft material such as an elastic roller (e.g., elastic rubber roller or resin foam roller, etc.).

Since the toner adhering to the intermediate transfer belt 61 due to the contact with the photoconductive drum 3 or the toner remaining on the intermediate transfer belt 61 because a transfer onto the paper sheet was not performed by the transfer roller 10 as described above causes color mixture of toner at the next process, the intermediate transfer belt cleaning unit 65 is configured to remove and collect the toner. The intermediate transfer belt cleaning unit 65 includes a cleaning blade that is, for example, a cleaning member in contact with the intermediate transfer belt 61 and the intermediate transfer belt 61 in contact with the cleaning blade is supported by the intermediate transfer belt driven roller 63 from the back side.

The paper feed cassette 81 is a tray for storing sheets (recording paper sheets) used for forming images and is provided on the under side of the exposure unit 1 in the apparatus main body 200. The sheets used for forming images may also be placed on a manual paper feed cassette 82. The paper discharge tray 91 provided on the upper side of the apparatus main body 200 is a tray for accumulating the printed recording sheets face-down.

The apparatus main body 200 is provided with a sheet carrying path S in an approximate vertical shape for sending the sheets in the paper feed cassette 81 and the manual paper feed cassette 82 to the paper discharge tray 91 via the transfer roller 10 and the fixing unit 7. Pickup rollers 11*a*, 11*b*, a plurality of carrying rollers 12*a* to 12*d*, a resist roller 13, the transfer roller 10, the fixing unit 7, etc. are disposed near the sheet carrying path S from the paper feed cassette 81 and the manual paper feed cassette 82 to the paper discharge tray 91.

The carrying rollers 12*a* to 12*d* are a plurality of small rollers for facilitating/aiding the carriage of the sheets and are provided along the sheet carrying path S. The pickup roller 11*a* is provided near the end of the paper feed cassette 81 and picks up the sheets one-by-one from the paper feed cassette 81 to supply the sheets to the sheet carrying path S. The pickup roller 11b is similarly provided near the end of the manual paper feed cassette 82 and picks up the sheets one-by-one from the manual paper feed cassette 82 to supply the sheets to the sheet carrying path S.

The resist roller 13 is a roller to temporarily hold the sheet carried through the sheet carrying path S. The resist roller 13 has a function of carrying the sheet to the transfer roller 10 at the timing matching the leading end of the toner image on the photoconductive drum 3 with the leading end of the sheet.

The fixing unit 7 includes a heat roller 71 and a pressure roller 72, and the heat roller 71 and the pressure roller 72 are rotated while sandwiching the sheet. The heat roller 71 is set to be a predetermined fixing temperature by a control unit based on a signal from a temperature detector not shown in the figure, and has a function of performing the thermocompression of the toner against the sheet along with the pressure roller 72 to melt/mix/press the multicolor toner image transferred to the sheet and thereby thermally fixes the multicolor toner image onto the sheet. An external heating belt 73 is also provided to heat the heat roller 71 from the outside.

The sheet carrying path will then be described in detail. As described above, the image forming apparatus is provided with the paper feed cassette 81 containing preliminary sheets in advance and the manual paper feed cassette 82. The respective pickup rollers 11a and 11b are disposed to feed sheets from these feed cassettes 81 and 82 and guide the sheets one-by-one to the sheet carrying path S.

A sheet carried from the paper feed cassette 81 and 82 is carried to the resist roller 13 by the carrying roller 12a on the sheet carrying path S and is carried to the transfer roller 10 at the timing matching the leading end of the sheet with the leading end of the image information on the intermediate transfer belt 61, and the image information is written onto the sheet. Subsequently, when the sheet passes through the fixing unit 7, the unfixed toner on the sheet is thermally melted/fixed and the sheet passes through the carrying roller 12b disposed subsequently and is discharged on the paper discharge tray 91.

Although the above carrying path described above is used when one-side printing is requested for a sheet, whereas, when two-side printing is requested, after the one-side printing is completed as described above and the rear end of the sheet passing through the fixing unit 7 is gripped by the final carrying roller 12b, the carrying roller 12b is reversely rotated to guide the sheet to the carrying rollers 12c and 12d. Subsequently, after the sheet passes through the resist roller 13 and the printing is performed on the back side of the sheet, the sheet is discharged on the paper discharge tray 91.

The carrying roller 12b corresponds to a reverse roller of the sheet carrying device of the present invention described later.

Figure 2:
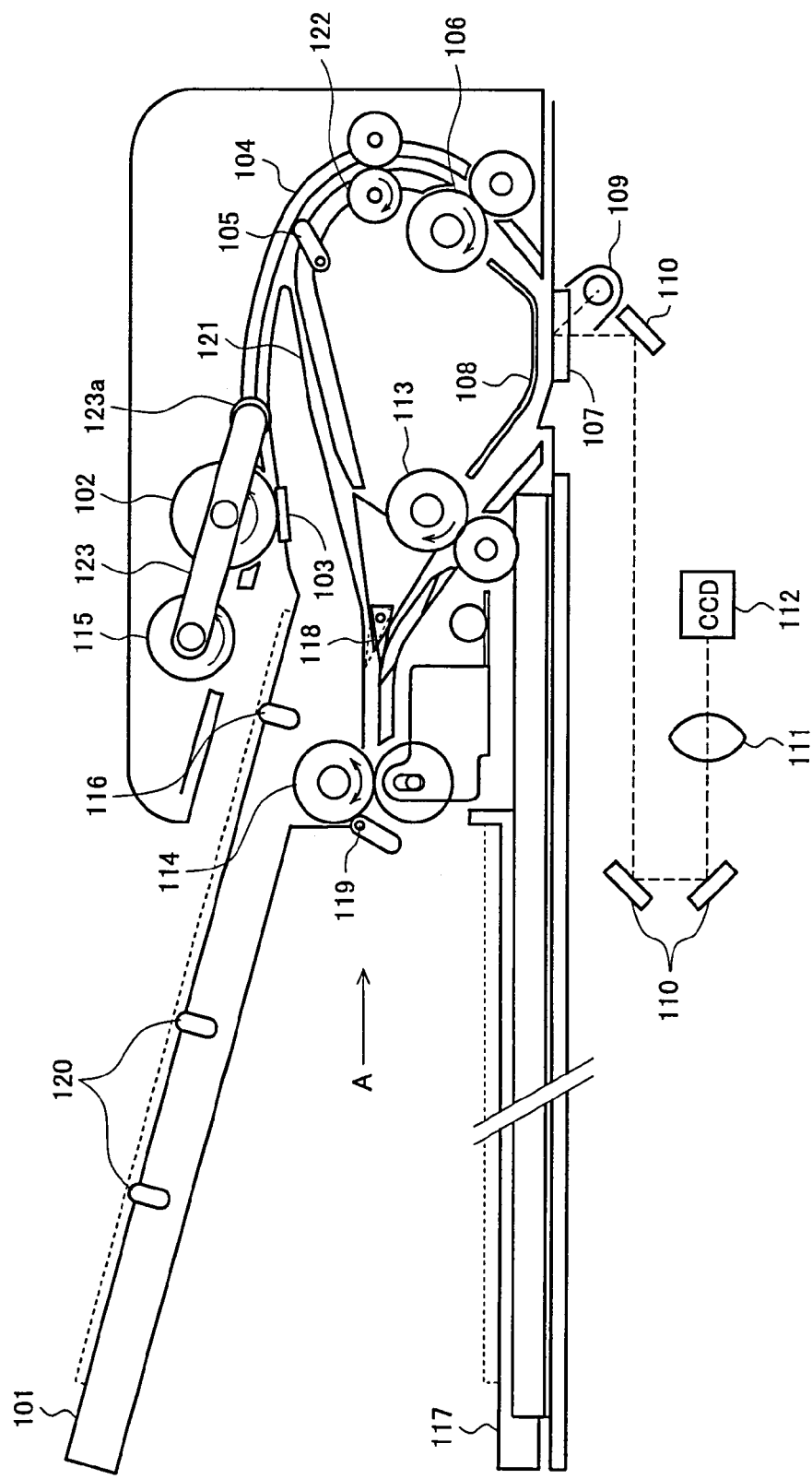
FIG. 2 depicts a cross-section of an auto document feeder equipped with the sheet carrying device according to one embodiment of the present invention.

FIG. 2 depicts a cross-section of the auto document feeder 300.

A document tray 101 is a tray for placing a document, and a document placed on the document tray 101 is detected by a document presence detecting sensor 116, and the size thereof is detected by a document size sensor 120.

A pick roller 115 is disposed at one end of a pick arm 123 and the pick roller 115 is separated from or brought into contact with the surface of a top document by driving the pick arm 123 with a solenoid not shown in the figure. An end of the pick arm 123, which is on the side unprovided with the pick roller 115, comes into contact with the sheet carrying path to regulate an angle of the pick arm when the pick roller 115 is moved upward. Since the document passes between the end of the pick arm 123, which is on the side unprovided with the pick roller 115, and the carrying path, a pick arm roll 123a is disposed at the end of the pick arm 123, which is on the side unprovided with the pick roller 115, to facilitate smooth travel of the document. The pick roller 115 feeds a top document and a handling roller 102 separates and sends the document fed from the document tray into a first carrying path 104 in combination with a separation pad 103. A carriage sensor 105 disposed on the first carrying path 104 detects an end of the document.

The document is carried to a resist roller 106 by the carrying roller 122. The resist roller 106 pushes and aligns the leading end of the document. Light emitted from a light-source lamp 109 is applied to the document carried along a read guide 108. The light reflected from the document is transmitted through a read glass 107, focused by a lens 111 through a turning back mirror 110, and converted into image data by a CCD 112. The document passing the read glass 107 is carried by a lower carrying roller 113 to a reverse roller 114. A switch gate 118 normally rotates the front edge thereof counterclockwise due to its own weight and is in a state indicated with solid lines in FIG. 2. The read documents are discharged onto a paper discharge tray 117. The ends of the discharged documents are detected by a paper discharge sensor 119.

In the case of a double-side reading, the carrying path is switched by the switch gate 118 and the document is carried to a second carrying path 121 by reversing the reverse roller 114. The document goes through the first carrying path 104 again and is carried toward the read glass 7.

The reverse roller 114 corresponds to a reverse roller of the sheet carrying device of the present invention described later.

A structure of a backward-feed prevention valve which is a characterizing portion of the sheet carrying device according to the present invention will be described with reference to FIGS. 3 to 5.

Figure 3:
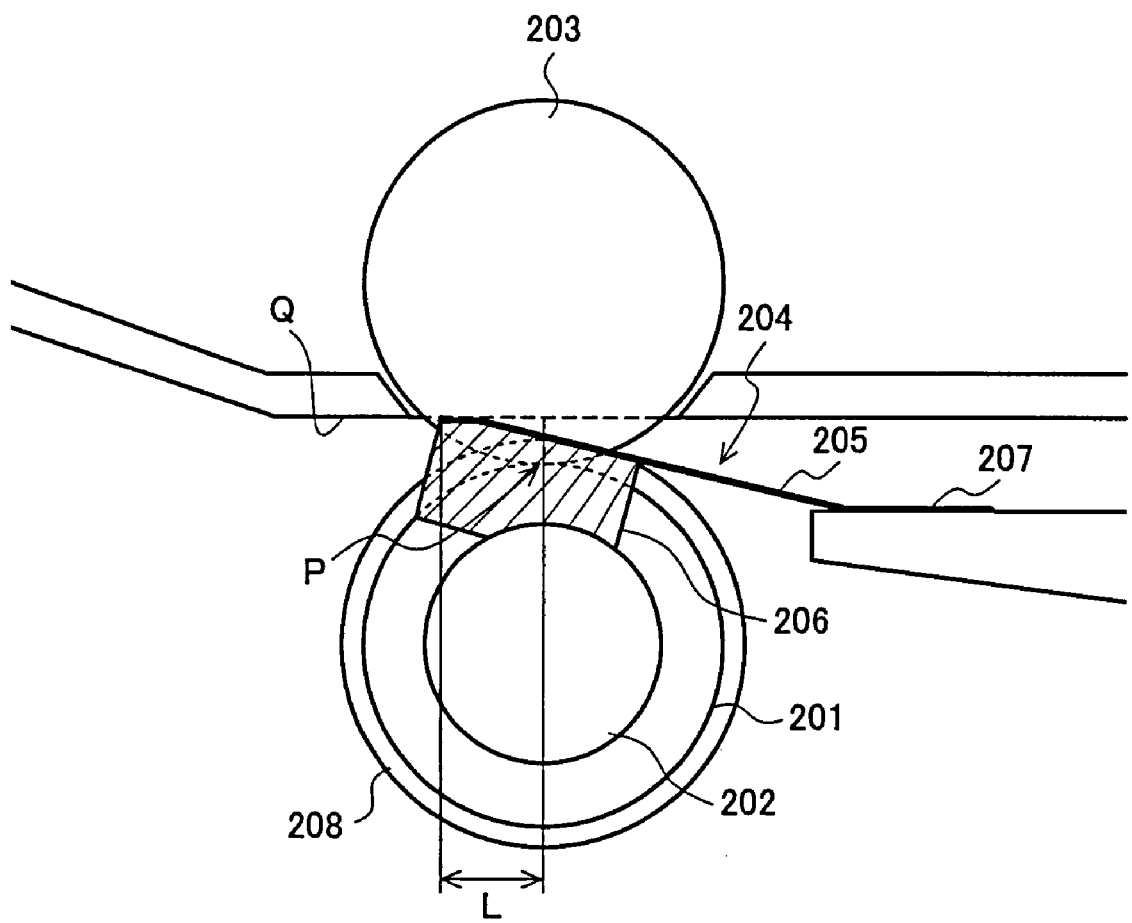
FIG. 3 depicts a configuration of a backward-feed prevention valve of the sheet carrying device according to one embodiment of the present invention.

FIG. 3 is a cross-sectional view of the backward-feed prevention valve viewed from the side same as FIG. 1; FIG. 4 depicts the backward-feed prevention valve viewed from below; and FIG. 5 depicts the backward-feed prevention valve viewed from the direction of an arrow A of FIG. 2, i.e., the direction in which a sheet will be discharged.

A reverse roller 201 is a driving roller, is fixed by a support shaft 202 supported rotatably, and is opposed to a reverse roller 203 that is a driven roller, and the both rollers are pressed against each other at the pressing portion P that is a nip portion.

A backward-feed prevention valve 204 is comprised of a resin sheet 205 and an elastic member 206 is disposed at one end on the sheet discharging side of the resin sheet 205, and the other side of the resin sheet 205 is fixed to the sheet guide 207.

The elastic member 206 has a shape and a thickness defined such that the under side thereof is supported by the support shaft 202 of the reverse roller and that the upper side thereof presses the resin sheet 205 against the underside of a carriage surface Q. Therefore, the resin sheet 205 is pressed against the carriage surface with a sufficient pressing force even when the resin sheet 205 is thin. The pressing force may easily be adjusted by changing a thickness or selecting a material of the elastic member 206.

An edge position (the left surface) on the sheet discharging side of the elastic member 206 attached to the edge of the resin sheet 205 is located away from the pressing portion P between the reverse roller 201 and the reverse roller 203 with the predetermined distance L or more in the sheet discharging direction. Therefore, the backward feed of a sheet may certainly be prevented, as described later.

Figure 4:
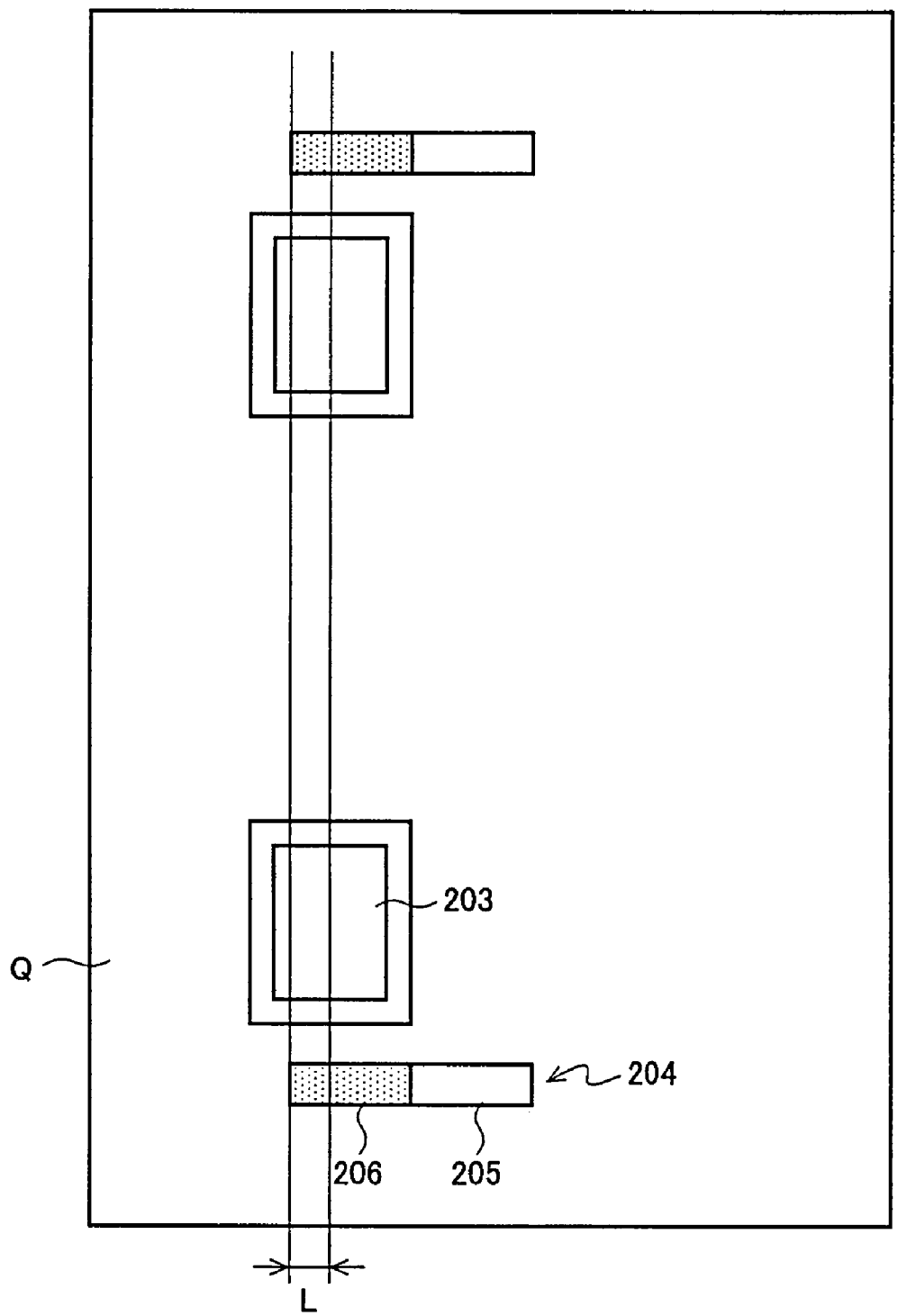
FIG. 4 depicts the backward-feed prevention valve of the sheet carrying device according to one embodiment of the present invention when viewed from below.

As shown in FIG. 4, the backward-feed prevention valves 204 are respectively disposed on the outside of the two reverse rollers 203 attached along the axial direction in this embodiment to prevent the both ends of the sheet located in the direction orthogonal to the sheet carriage direction (the axial direction of the reverse rollers) from entering into the pressing portion P. Since the backward-feed prevention valves 204 are respectively disposed on the both ends in the axial direction of the reverse rollers 201, a center portion of the sheet edge does not enter into the pressing portion P.

Figure 5:
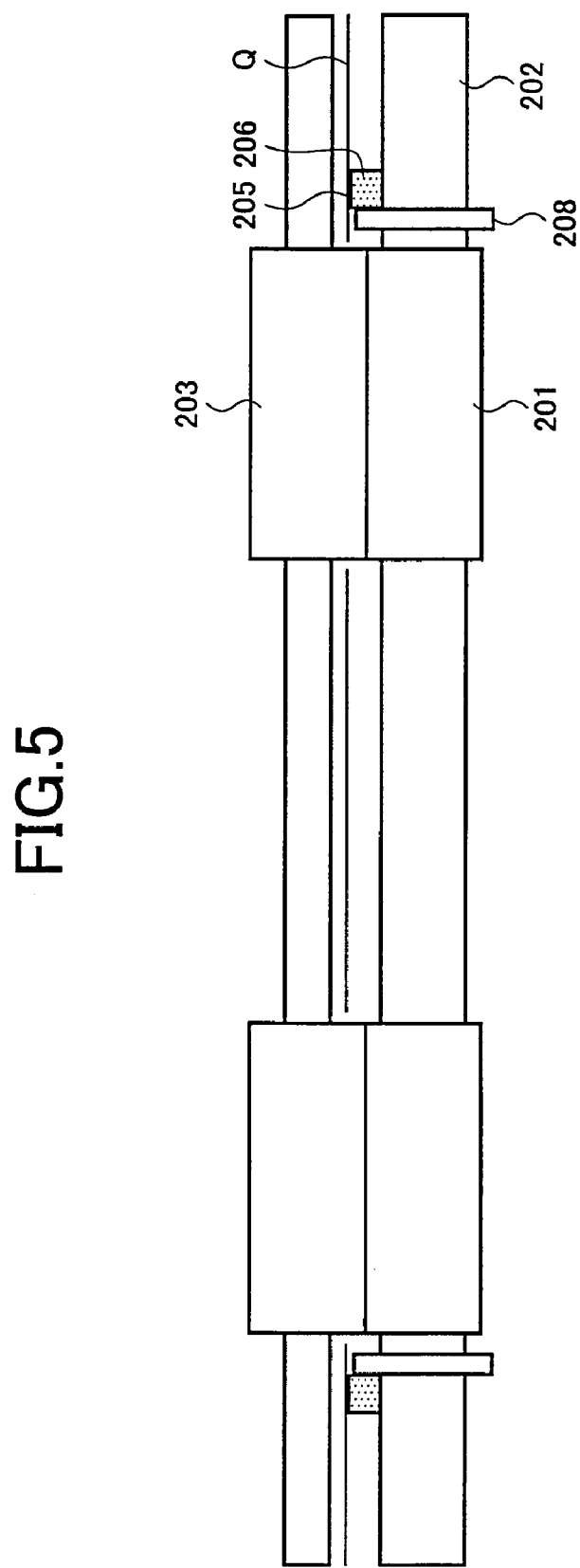
FIG. 5 depicts the backward-feed prevention valve of the sheet carrying device according to one embodiment of the present invention when viewed from the direction of discharging a sheet.

As shown in FIG. 5, the elastic member 206 of the backward-feed prevention valve 204 is attached on the outside of a collar 208 disposed coaxially on the outside of the reverse roller 201 along the axial direction with the one side thereof in contact with the collar 208. Therefore, the backward-feed prevention valve 204 may easily be positioned when attached and misalignment of the attachment position may be prevented.

The collar 208 has a circular shape with a diameter slightly greater than that of the reverse roller 201 and the surface thereof may be made up of a member made of a smooth low-friction resin. The collar 208 bends (stiffens) a discharged sheet and prevents a sheet from entering into the pressing portion P like the backward-feed prevention valve 204.

Figure 6:
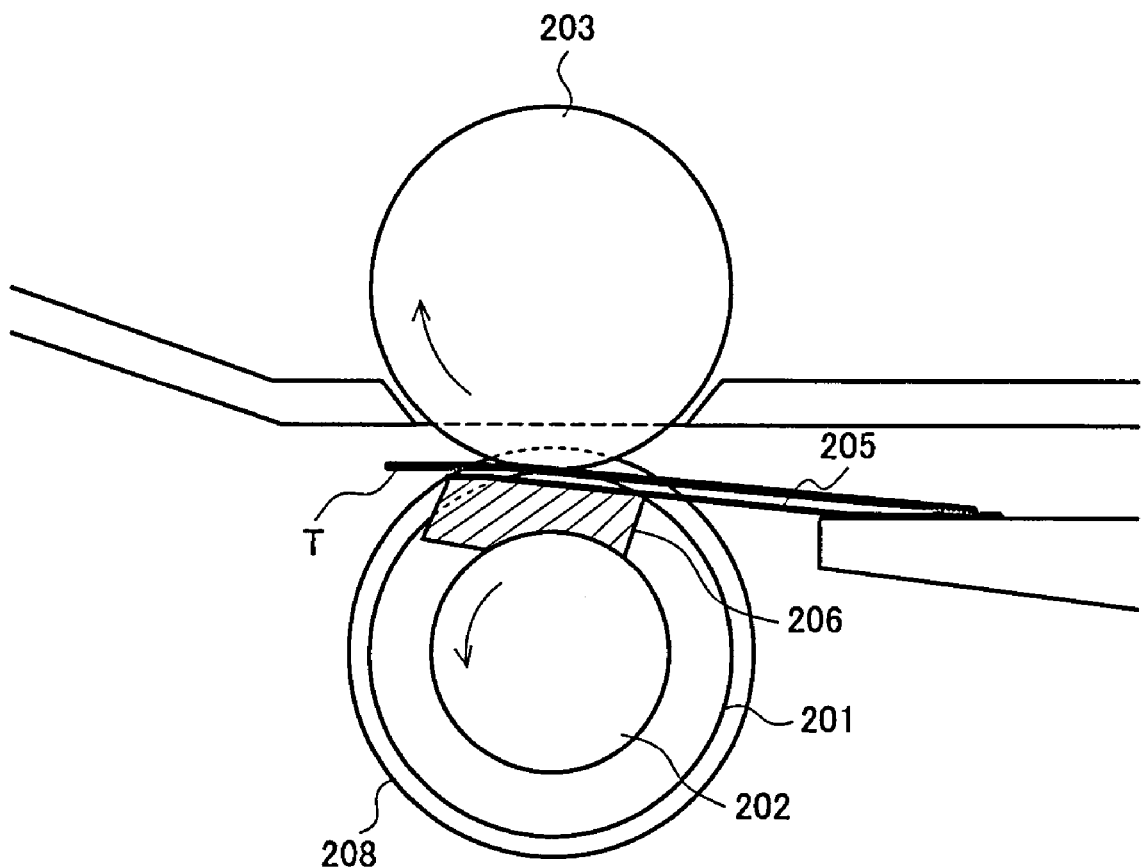
FIG. 6 depicts a state of the backward-feed prevention valve when a sheet is discharged in the sheet carrying device according to one embodiment of the present invention.
Figure 7:
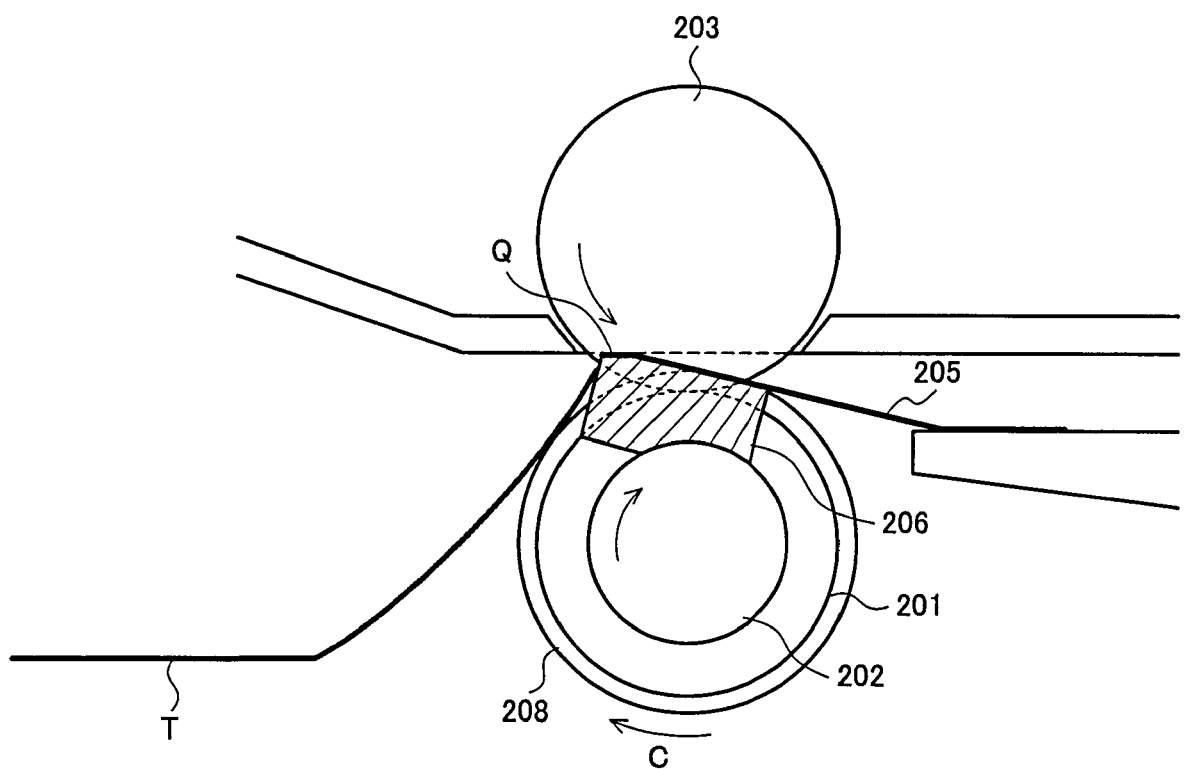
FIG. 7 depicts a state preventing the backward feed of a discharged sheet in the sheet carrying device according to one embodiment of the present invention.

FIG. 6 depicts a state of the backward-feed prevention valve 204 at the time of discharging a sheet, and when the reverse roller 201 rotates anticlockwise (at the time of normal discharge) and a sheet T carried from the right side of FIG. 6 passes the reverse roller 201, the resin sheet 205 is pressed down by the edge of the sheet T and allows the sheet T to be carried to the left side of FIG. 6 by the reverse roller 201 and the reverse roller 203.

On the other hand, if the sheet T is once discharged in the sheet discharging direction from the edge of surface on the sheet discharging side of the elastic member 206, the resin sheet 205 is pressed against the underside of the carriage surface Q again due to the elasticity of the elastic member 206. Therefore, when the reverse roller 201 rotates clockwise (at the time of reverse carriage), the rear edge of the discharged sheet T is prevented by the left surface of the elastic member 206 from entering again into the pressing portion P. Since the left surface of the elastic member 206 is disposed away from the pressing portion P with the distance L or more in the carriage direction, the sheet T is not gripped again by the pressing portion P.

According to the present invention, the following effects may be acquired.

Since the elastic member is disposed at the edge of the backward-feed prevention valve so that one surface of the elastic member is supported with the reverse roller shaft and the opposite surface presses the backward-feed prevention valve against the carriage surface, the force pressing the backward-feed prevention valve against the carriage surface may be stabilized for a long time, and the smooth discharge and the reliable prevention of backward feed may be achieved with a simple configuration.

The invention claimed is:

1. A sheet carrying device comprising:
   a carriage surface that guides a sheet;
   a reverse roller attached to a rotation shaft of a sheet discharging portion, whose rotation direction is switchable between forward and backward; and
   a backward-feed prevention valve that prevents an edge of a discharged sheet from entering into a nip portion of the reverse roller, wherein
   the backward-feed prevention valve includes a resin sheet and an elastic member which is disposed at one end on the sheet discharging side of the resin sheet, and the elastic member has one surface supported by the rotation shaft of the reverse roller and the other surface pressing the resin sheet against the carriage surface.

2. The sheet carrying device as defined in claim 1, wherein the edge of surface on the sheet discharging side of the elastic member is located further toward the sheet discharging side than the nip portion of the reverse roller.

3. The sheet carrying device as defined in claim 1, wherein the backward-feed prevention valves are disposed at the both axial ends of the reverse roller, respectively.

4. The sheet carrying device as defined in claim 1, wherein the reverse roller has a coaxial collar and the side of the elastic member of the backward-feed prevention valve is in contact with the collar.

5. A document carrying apparatus comprising the sheet carrying device as defined in claim 1.

6. An image forming apparatus comprising the sheet carrying device as defined in claim 1.

* * * * *